UNITED STATES PATENT OFFICE.

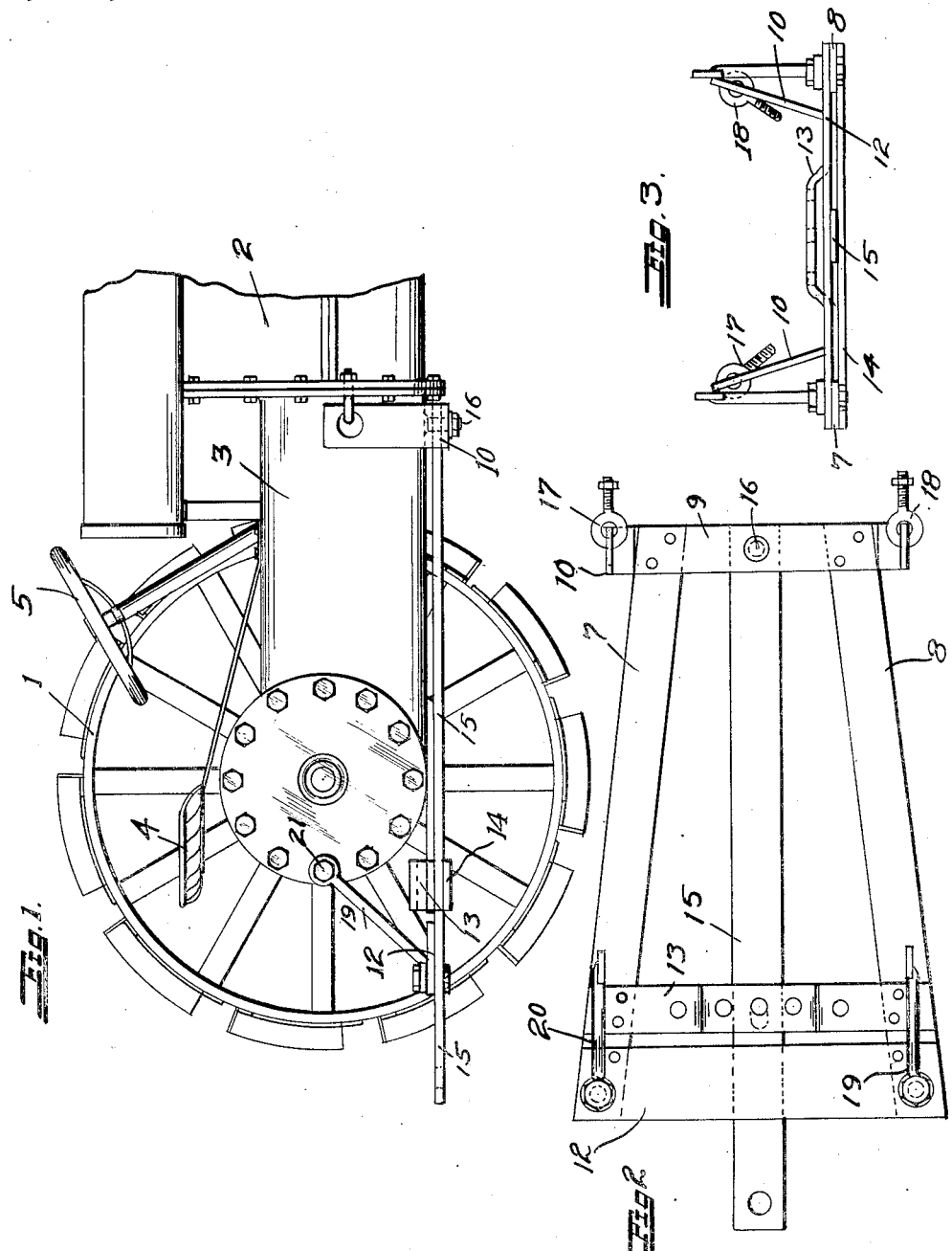

GEORGE ZIMMER, OF ACAMPO, CALIFORNIA, ASSIGNOR OF ONE-FOURTH TO WILLIAM C. WHITMORE AND ONE-FOURTH TO A. A. G. ZIMMER, BOTH OF OAKLAND, CALIFORNIA.

DRAWBAR FOR TRACTORS.

1,408,057.  Specification of Letters Patent.  Patented Feb. 28, 1922.

Application filed February 16, 1920. Serial No. 359,205.

*To all whom it may concern:*

Be it known that I, GEORGE ZIMMER, citizen of the United States, residing at Acampo, in the county of San Joaquin, State of California, have invented a new and useful Drawbar for Tractors, of which the following is a specification in such full and clear terms as will enable those skilled in the art to construct and use the same.

This invention relates to a draw bar for tractors, an object of which is to transfer the point of draught to the front of the rear axle and to provide means whereby the tractor may be more easily turned.

A further object of the invention is to provide a draw bar for tractors which will prevent the tractors from overturning as frequently happens with small tractors having large rear wheels when the plow or apparatus pulled by the tractor comes against a stump or rock.

Other objects of the invention will appear as the description proceeds.

An embodiment of the invention is shown in the drawings in which the same reference numeral is applied to the same portion throughout, but I am aware that there may be modifications thereof.

Fig. 1 is a side elevation of the rear portion of a tractor showing this draw bar applied thereto, Fig. 2 is a plan view of the complete draw bar, and Fig. 3 is a rear end elevation of the draw bar.

The numeral 1 indicates the tractor wheel, 2 the engine casing, and 3 the transmission case. The driver uses the seat 4, and steers by means of the wheel 5.

This draw bar comprises a horizontal trapezoidal frame, having legs 7 and 8 connected at their front ends by means of the plate 9 and by a U shaped plate 10 which extends below the legs 7 and 8 and is secured thereto under the plate 9.

At the rear ends, the legs 7 and 8 are connected by the transverse plate 12 in front of which are two plates 13 and 14 which form a guide for the movement of the draw bar link 15. The link 15 is pivotally mounted at 16 on the two plates 9 and 10 and it extends between the two plates 13 and 14 a distance to the rear of the plate 12.

The entire structure is connected to the tractor by means of two I bolts 17 and 18 which are connected to the front flange of the transmission casing 3; and two short links 19 and 20 extend from the casing of the plate 12 upwardly to the rear of the differential housing and are bolted thereto as indicated at 21.

The plates 13 and 14 have holes therethrough and receive suitable pins to permit the link 15 to be pulled permanently to one side of the tractor when pulling plows close to trees or when turning around. The link 15 may be free to move from side to side as may be necessary to permit the tractor to turn in the shortest possible compass.

It is to be observed that when assembled upon the tractor, that the link 15 extends beyond the periphery of the drive wheels, as a result of which construction the tractor cannot turn over backwardly when the plow or cultivator happens to strike an obstruction that the tractor cannot pull.

What I claim is as follows, but various modifications may be made in the construction shown in the drawings and above particularly described form, within the purview of my invention.

A draw bar frame for tractors comprising a flat frame having two transversely and longitudinally extending members, one of said members forming a yoke adapted to be bolted to the engine frame at the front, and the other of said members connecting the rear ends of the longitudinally extending members at a point back of the periphery of the tractor supporting wheels, braces for connecting the rear end of the frame to the engine frame for supporting the draw bar, and a draw bar pivotally connected to the front end of the draw bar frame and capable of moving laterally with respect to the rear of said frame.

In testimony whereof I have hereunto set my hand this 31st day of Jan. A. D. 1920.

GEORGE ZIMMER.